(12) United States Patent
Kang

(10) Patent No.: US 11,208,069 B2
(45) Date of Patent: Dec. 28, 2021

(54) COVER DEVICE FOR AIRBAG

(71) Applicant: HYUNDAI MOBIS Co., Ltd., Seoul (KR)

(72) Inventor: Jeong Seok Kang, Yongin-si (KR)

(73) Assignee: Hyundai Mobis Co., Ltd., Seoul (KR)

(*) Notice: Subject to any disclaimer, the term of this patent is extended or adjusted under 35 U.S.C. 154(b) by 0 days.

(21) Appl. No.: 16/911,927

(22) Filed: Jun. 25, 2020

(65) Prior Publication Data

US 2020/0406849 A1 Dec. 31, 2020

(30) Foreign Application Priority Data

Jun. 26, 2019 (KR) ............. 10-2019-0076175

(51) Int. Cl.
*B60R 21/215* (2011.01)
*B60R 21/2165* (2011.01)

(52) U.S. Cl.
CPC ........ *B60R 21/215* (2013.01); *B60R 21/2165* (2013.01)

(58) Field of Classification Search
CPC . B60R 21/215; B60R 21/2165; B60R 21/203; B60R 21/2035; B60R 21/20
See application file for complete search history.

(56) References Cited

U.S. PATENT DOCUMENTS

| | | | | |
|---|---|---|---|---|
| 5,647,610 A * | 7/1997 | Nagata | ............ | B60Q 5/003 280/731 |
| 5,658,008 A * | 8/1997 | Herrmann | ............ | B60R 21/217 280/728.2 |
| 7,708,309 B2 * | 5/2010 | Kim | ............ | B60R 21/2035 280/731 |
| 7,758,065 B2 * | 7/2010 | Weigand | ............ | B60R 21/2035 280/728.2 |
| 8,205,908 B2 * | 6/2012 | Matsu | ............ | B60R 21/2035 280/728.2 |
| 8,256,797 B2 * | 9/2012 | Sakurai | ............ | B60R 21/2037 280/731 |
| 8,807,589 B2 * | 8/2014 | Yamami | ............ | B60R 21/217 280/728.2 |
| 9,061,650 B2 * | 6/2015 | Ko | ............ | B60R 21/203 |
| 9,156,400 B2 * | 10/2015 | Ishii | ............ | B60R 21/2037 |
| 9,333,937 B1 * | 5/2016 | Hock | ............ | B60R 21/21656 |
| 9,592,783 B2 * | 3/2017 | Nebel | ............ | B60R 21/217 |
| 9,694,780 B1 * | 7/2017 | Lowe | ............ | B60R 21/21656 |
| 10,315,605 B2 * | 6/2019 | Ishii | ............ | B60R 21/2037 |
| 10,532,715 B2 * | 1/2020 | Jacqmarcq | ............ | B60R 21/2037 |
| 10,899,302 B2 * | 1/2021 | Ishii | ............ | B60R 21/2037 |
| 2003/0184063 A1 * | 10/2003 | Yasuda | ............ | B29C 66/73921 280/732 |

(Continued)

FOREIGN PATENT DOCUMENTS

| | | | | |
|---|---|---|---|---|
| DE | 102019131911 A1 * | 5/2020 | ....... | B60R 21/21656 |
| EP | 1777121 A2 * | 4/2007 | ........... | B60R 21/217 |

(Continued)

*Primary Examiner* — Nicole T Verley
(74) *Attorney, Agent, or Firm* — H.C. Park & Associates, PLC

(57) ABSTRACT

A cover device for an airbag includes a cover unit having a stiffness rib formed on the inner surface thereof and a mounting plate unit positioned within the cover unit and having a stiffness groove part formed in the outer surface thereof and configured to guide the stiffness rib.

7 Claims, 7 Drawing Sheets

(56) References Cited

U.S. PATENT DOCUMENTS

| | | | | |
|---|---|---|---|---|
| 2004/0007854 | A1* | 1/2004 | Webber | B60R 21/203 |
| | | | | 280/728.2 |
| 2005/0194768 | A1* | 9/2005 | Bonam | B60R 21/217 |
| | | | | 280/728.2 |
| 2007/0045995 | A1* | 3/2007 | Adler | B60R 21/2165 |
| | | | | 280/728.3 |
| 2007/0278772 | A1* | 12/2007 | Burghardt | B60R 21/2037 |
| | | | | 280/731 |
| 2008/0036184 | A1* | 2/2008 | Takagi | B60R 21/21656 |
| | | | | 280/728.3 |
| 2008/0259467 | A1* | 10/2008 | Chung | G02B 7/08 |
| | | | | 359/814 |
| 2009/0096195 | A1* | 4/2009 | Idomoto | B60R 21/215 |
| | | | | 280/729 |
| 2011/0089672 | A1* | 4/2011 | Nebel | B60R 21/2037 |
| | | | | 280/728.2 |
| 2014/0131982 | A1* | 5/2014 | Ishii | B60R 21/2037 |
| | | | | 280/728.2 |
| 2014/0352118 | A1* | 12/2014 | Ko | B60R 21/21656 |
| | | | | 24/592.1 |
| 2015/0123383 | A1* | 5/2015 | Yoshida | B60R 21/2037 |
| | | | | 280/728.2 |
| 2015/0123384 | A1* | 5/2015 | Kwon | B60R 21/21656 |
| | | | | 280/728.3 |
| 2016/0114752 | A1* | 4/2016 | Banno | B60R 21/2165 |
| | | | | 280/728.2 |
| 2018/0029556 | A1* | 2/2018 | Ishii | B60R 21/2037 |
| 2018/0126939 | A1* | 5/2018 | Jacqmarcq | B60R 21/2037 |
| 2019/0054885 | A1* | 2/2019 | Kim | B60R 21/2035 |
| 2019/0299906 | A1* | 10/2019 | Ishii | B60R 21/2037 |
| 2020/0139917 | A1* | 5/2020 | Funk | B60R 21/2035 |

FOREIGN PATENT DOCUMENTS

| | | | | |
|---|---|---|---|---|
| EP | 3412516 A1 | * | 12/2018 | B60R 21/215 |
| WO | WO-2014203683 A1 | * | 12/2014 | B60R 21/215 |

* cited by examiner

COVER DEVICE FOR AIRBAG

CROSS-REFERENCE TO RELATED APPLICATION

This application claims priority from and the benefit of Korean Patent Application No. 10-2019-0076175, filed on Jun. 26, 2019, which is hereby incorporated by reference for all purposes as if set forth herein.

BACKGROUND

Field

Exemplary embodiments of the present disclosure relate to a cover device for an airbag, and more particularly, to a cover device for an airbag, which can secure stiffness and improve an assembly property by taking the beauty into consideration.

Discussion of the Background

In general, an airbag device is a device in which in the event of a vehicle accident, an airbag cushion is inflated by gas pressure introduced therein to protect an occupant by its cushion power. The airbag device may include an airbag device for a driver positioned in a steering wheel, an airbag device for a passenger seat positioned over a glove box, a knee airbag device positioned in an instrument panel, a curtain airbag device positioned along a roof rail, a side airbag device positioned on the side of a seat, etc. The airbag device for a driver includes an inflator that generates gas and an airbag cushion that is inflated and deployed to protect a driver when the gas generated from the inflator is introduced therein. The airbag cushion is normally folded in the steering wheel, and is inflated and deployed when the gas generated from the inflator is introduced therein in the case of a vehicle accident. An airbag cover is cut along a tear line, and has stiffness ribs provided on the outer surface thereof in order to prevent damage to the airbag cover when the airbag cover is cut along the tear line. However, the airbag cover has a problem in that it interferes with the surroundings or spoils the beauty of the airbag cover because the airbag cover is exposed to the outside. Accordingly, there is a need to improve such a problem.

SUMMARY

Exemplary embodiments of the present invention are directed to the provision of a cover device for an airbag, which can secure stiffness and improve an assembly property by taking the beauty into consideration.

In an embodiment, a cover device for an airbag may include a cover unit having a stiffness rib formed on the inner surface thereof and a mounting plate unit positioned within the cover unit and having a stiffness groove part formed in the outer surface thereof and configured to guide the stiffness rib.

Furthermore, the stiffness rib may have the same width as the stiffness groove part.

Furthermore, the cover unit includes a cover body having a tear line formed therein, a first cover plate extended from the edge of the cover body toward the mounting plate unit and configured to surround the outside of the mounting plate unit, a second cover plate extended from the edge of the cover body toward the mounting plate unit and positioned on the outside of the first cover plate so as to be spaced apart from the first cover plate, and the stiffness rib protruding from the inner surface of the first cover plate toward the mounting plate unit.

Furthermore, the mounting plate unit includes a mounting plate bottom unit and a mounting plate body extended from the edge of the mounting plate bottom unit toward the first cover plate and having the stiffness groove part formed in the outer surface thereof.

Furthermore, the stiffness rib is elongated in the lengthwise direction of the first cover plate. The stiffness groove part is elongated in the mounting plate body in the lengthwise direction of the stiffness groove part.

Furthermore, the stiffness ribs are formed in a plural number along the inner circumference of the first cover plate so as to be spaced apart from each other. The stiffness groove parts are formed in a plural number along the inner circumference of the mounting plate body so as to be spaced apart from each other at the same intervals as the stiffness ribs.

Furthermore, a plurality of coupling hole parts is formed along the circumference of the first cover plate so as to be spaced apart from each other. The stiffness ribs are disposed between the coupling hole parts. Coupling protrusions coupled to the coupling hole parts are formed along the circumference of the mounting plate body so as to be spaced apart from each other. The stiffness groove parts are disposed between the coupling protrusions.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
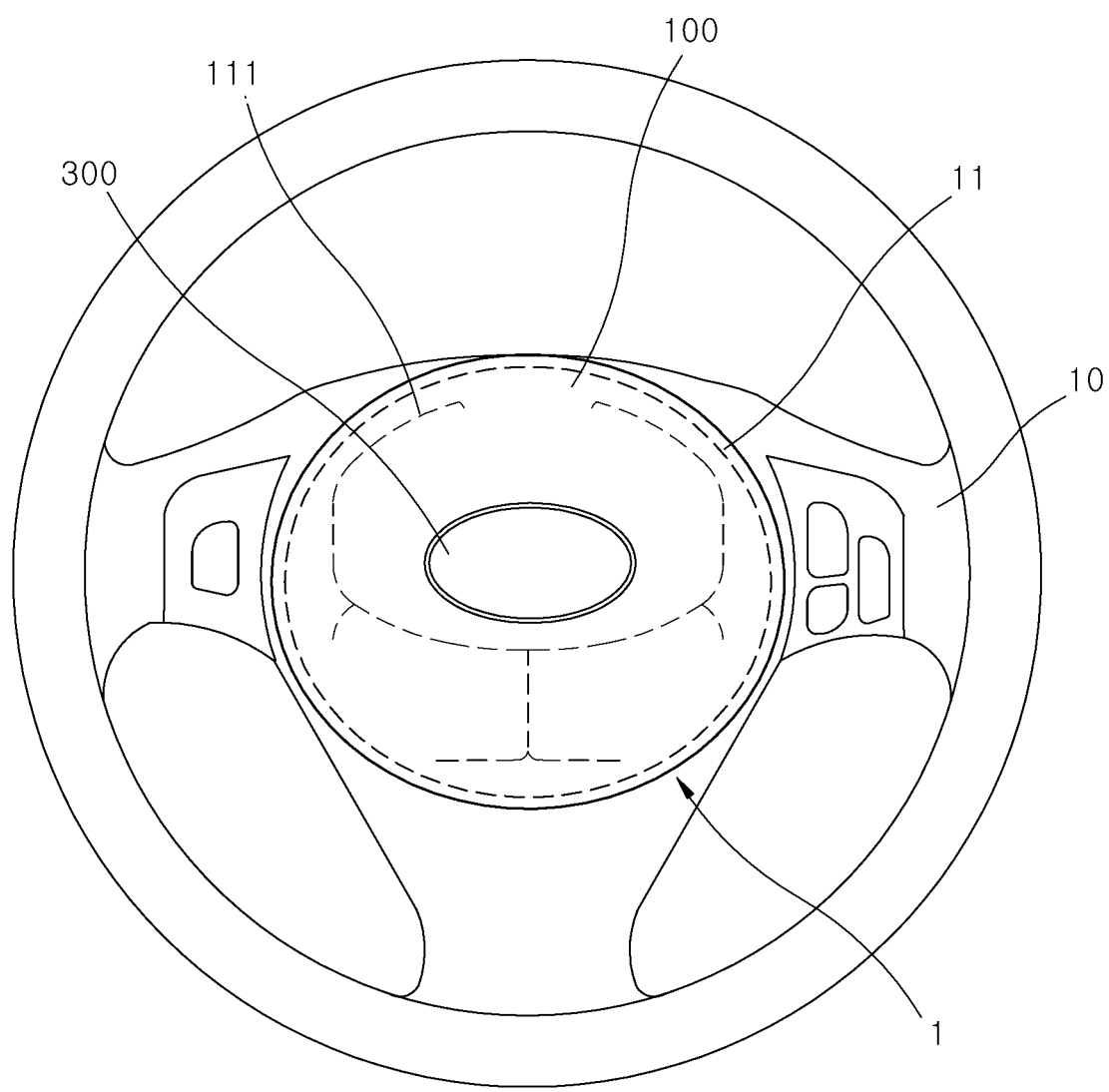
FIG. 1 is a diagram schematically illustrating a cover device for an airbag according to an embodiment of the present disclosure.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

Hereinafter, a cover device for an airbag will be described with reference to the accompanying drawings through various exemplary embodiments.

The thicknesses of lines or the sizes of elements shown in the drawings in a process of describing this specification may have been exaggerated for the clarity and convenience of a description. Terms to be described below have been defined by taking into consideration their functions in the present disclosure, and may be different depending on a user or operator's intention or practice. Accordingly, such terms should be defined based on the overall contents of this specification.

It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

Figure 2:
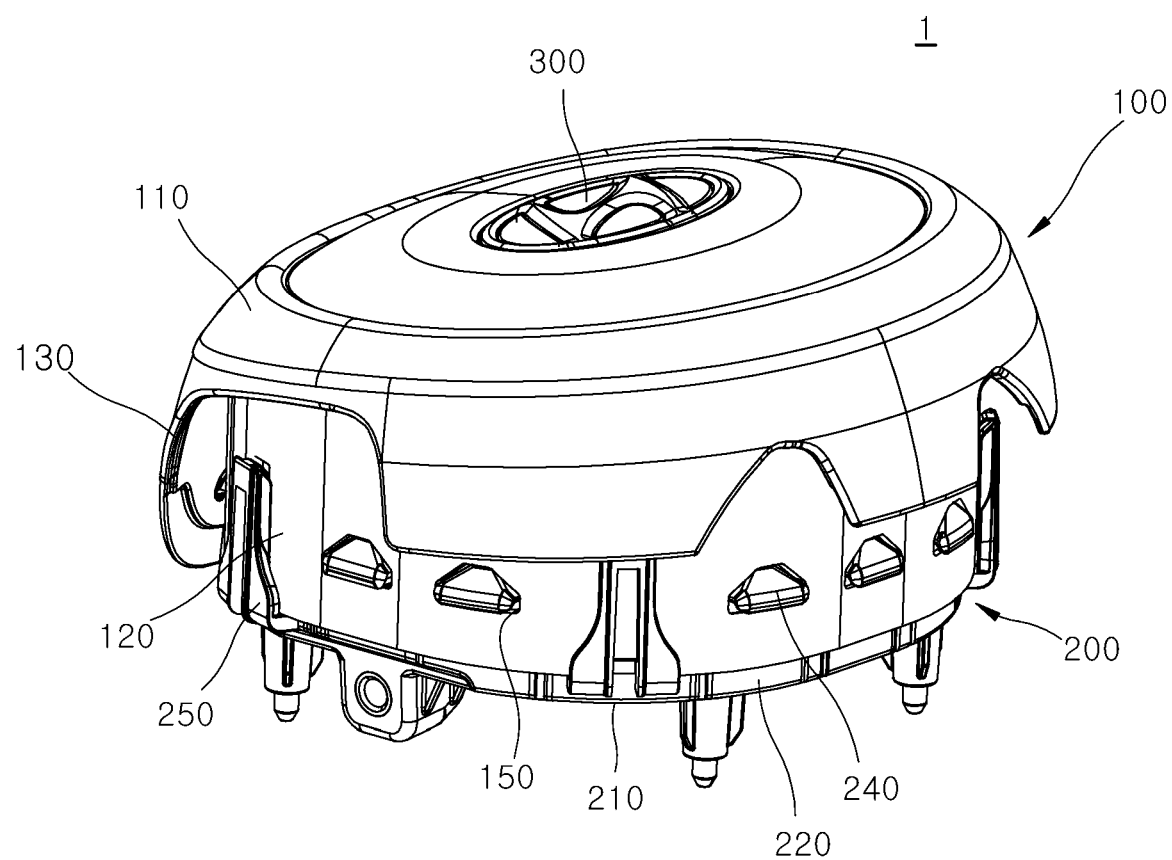
FIG. 2 is a perspective view of the cover device for an airbag according to an embodiment of the present disclosure.
Figure 3:
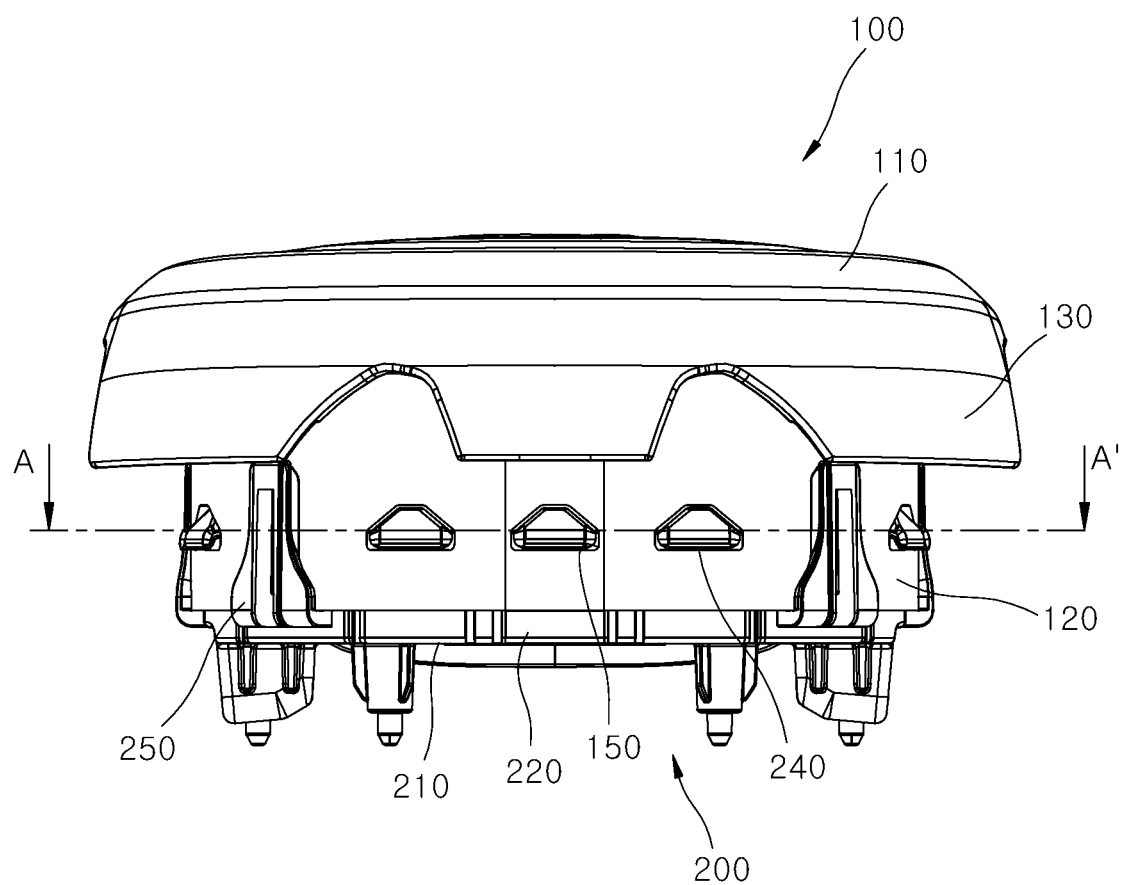
FIG. 3 is a perspective view of the cover device for an airbag according to an embodiment of the present disclosure, when viewed in another direction.
Figure 4:
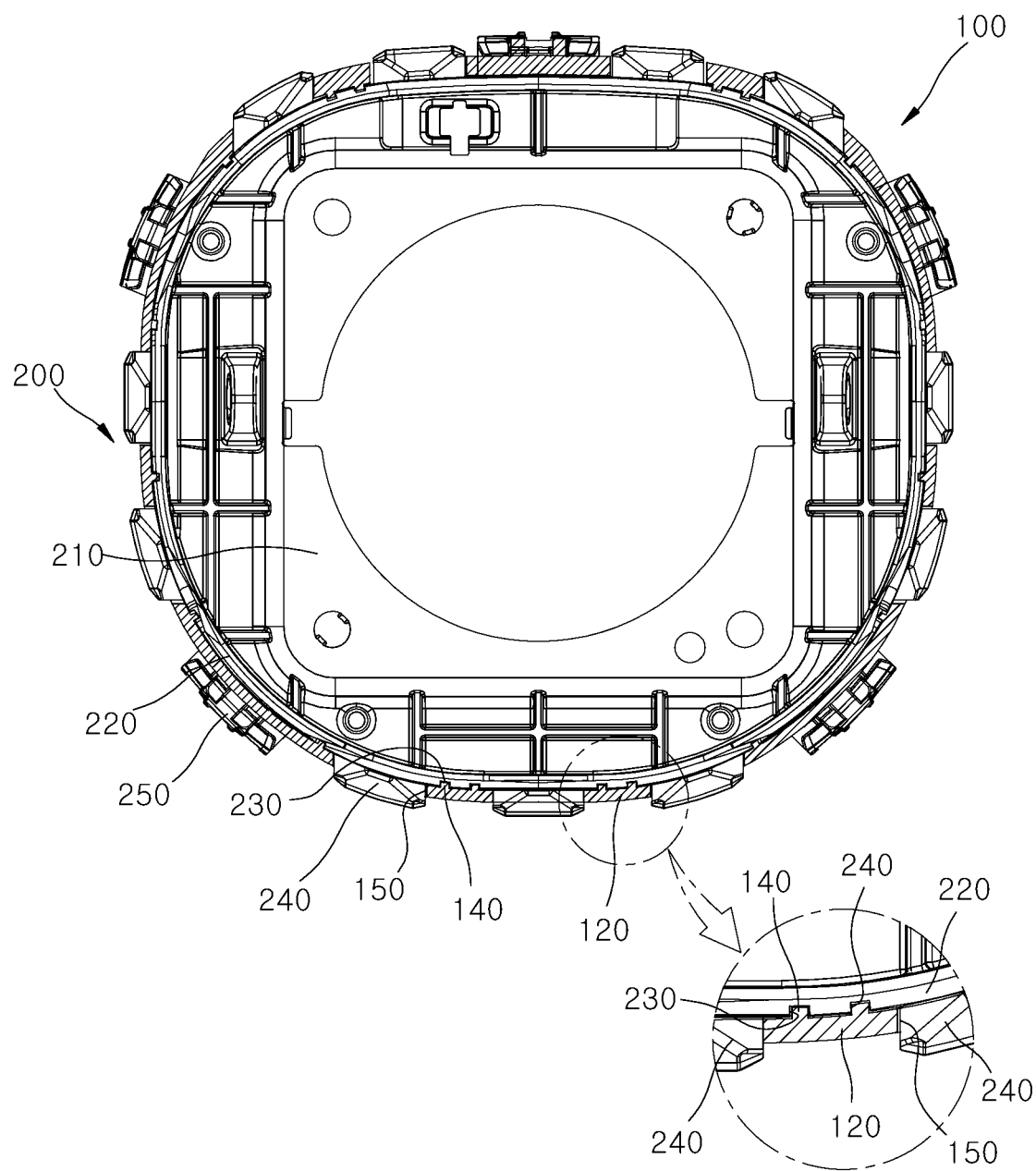
FIG. 4 is a cross-sectional view taken along line A-A' in FIG. 3.
Figure 5:
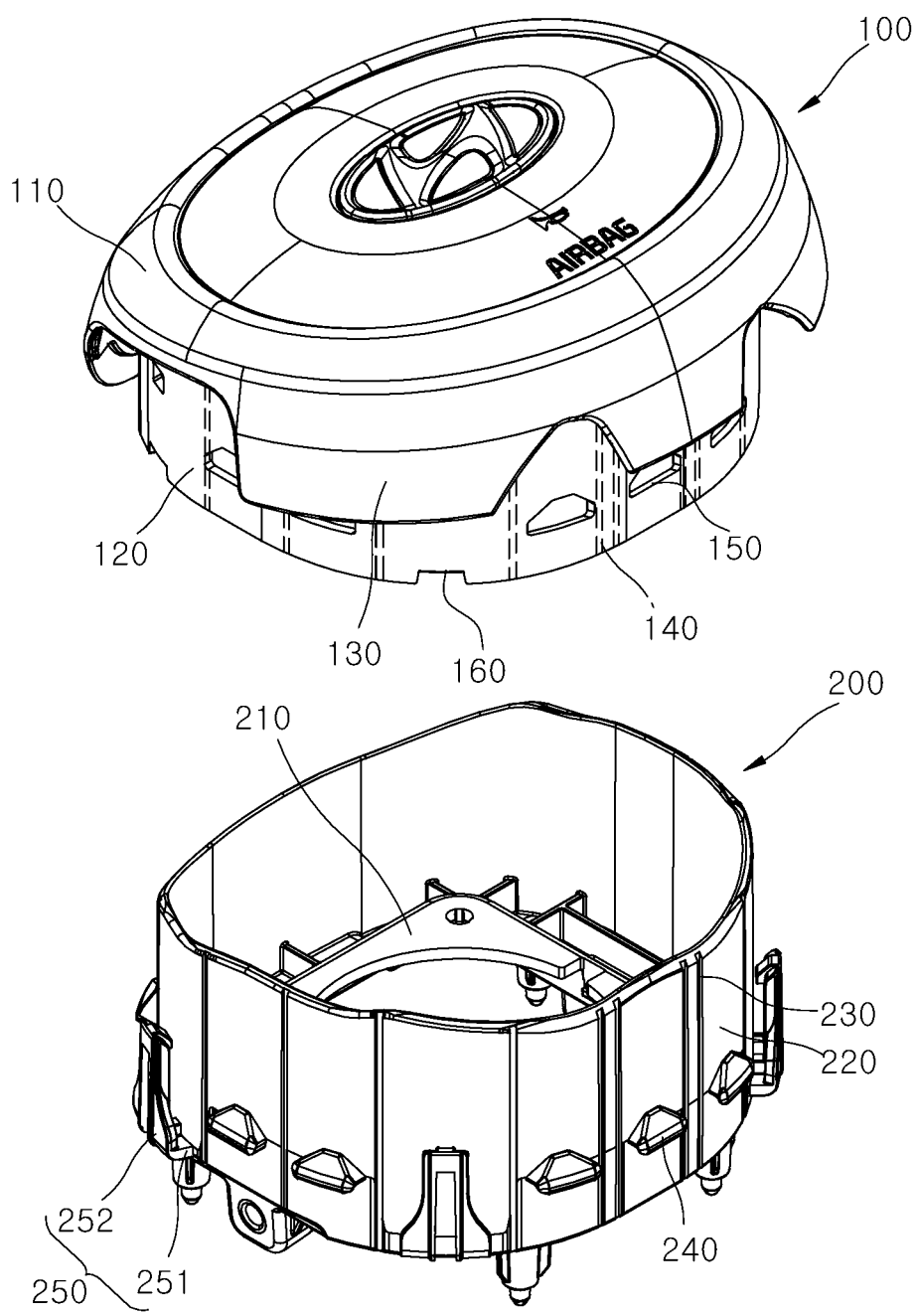
FIG. 5 is an exploded perspective view of the cover device for an airbag according to an embodiment of the present disclosure.
Figure 6:
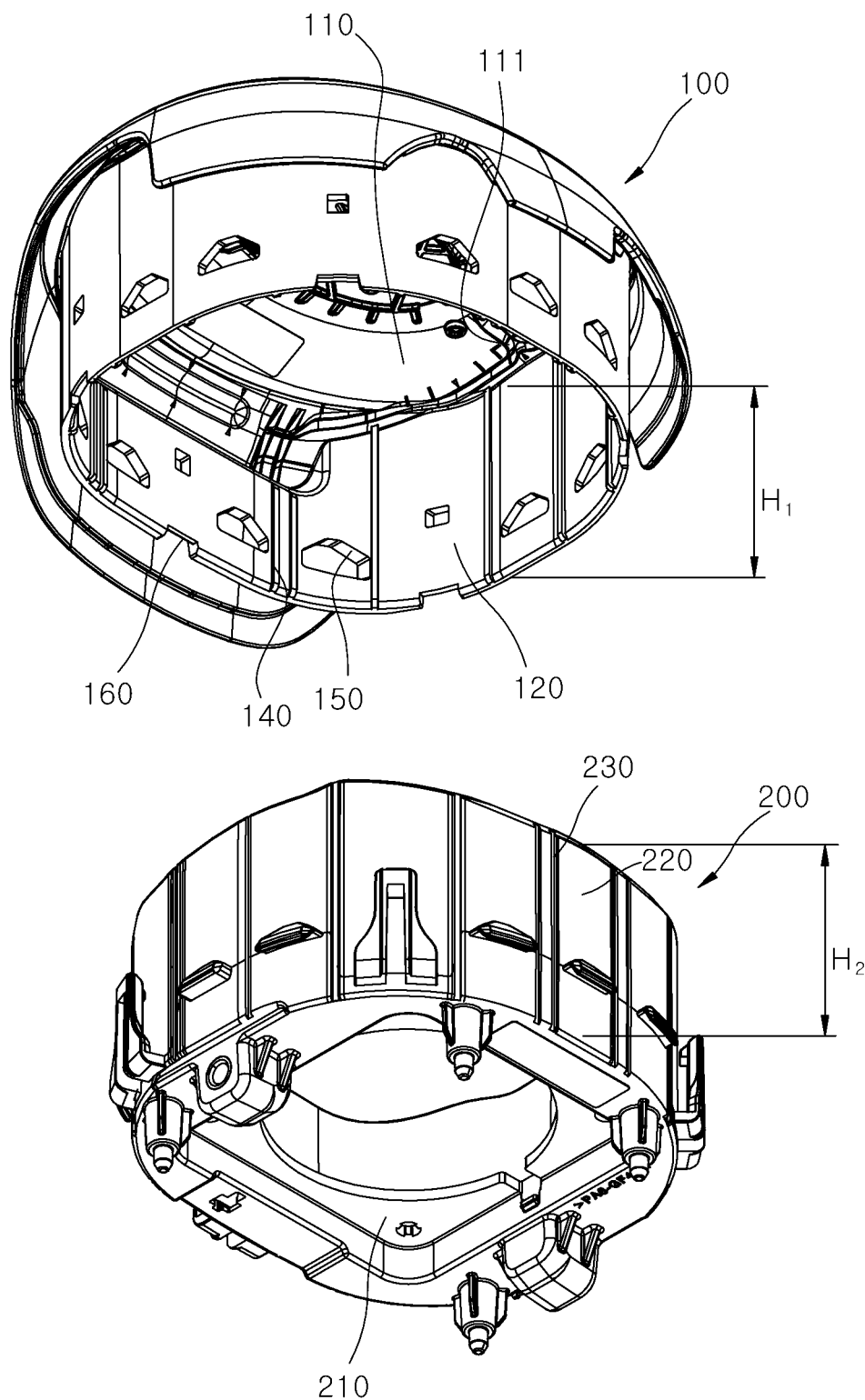
FIG. 6 is a perspective view of the cover device for an airbag according to an embodiment of the present disclosure, when viewed in another direction.
Figure 7:
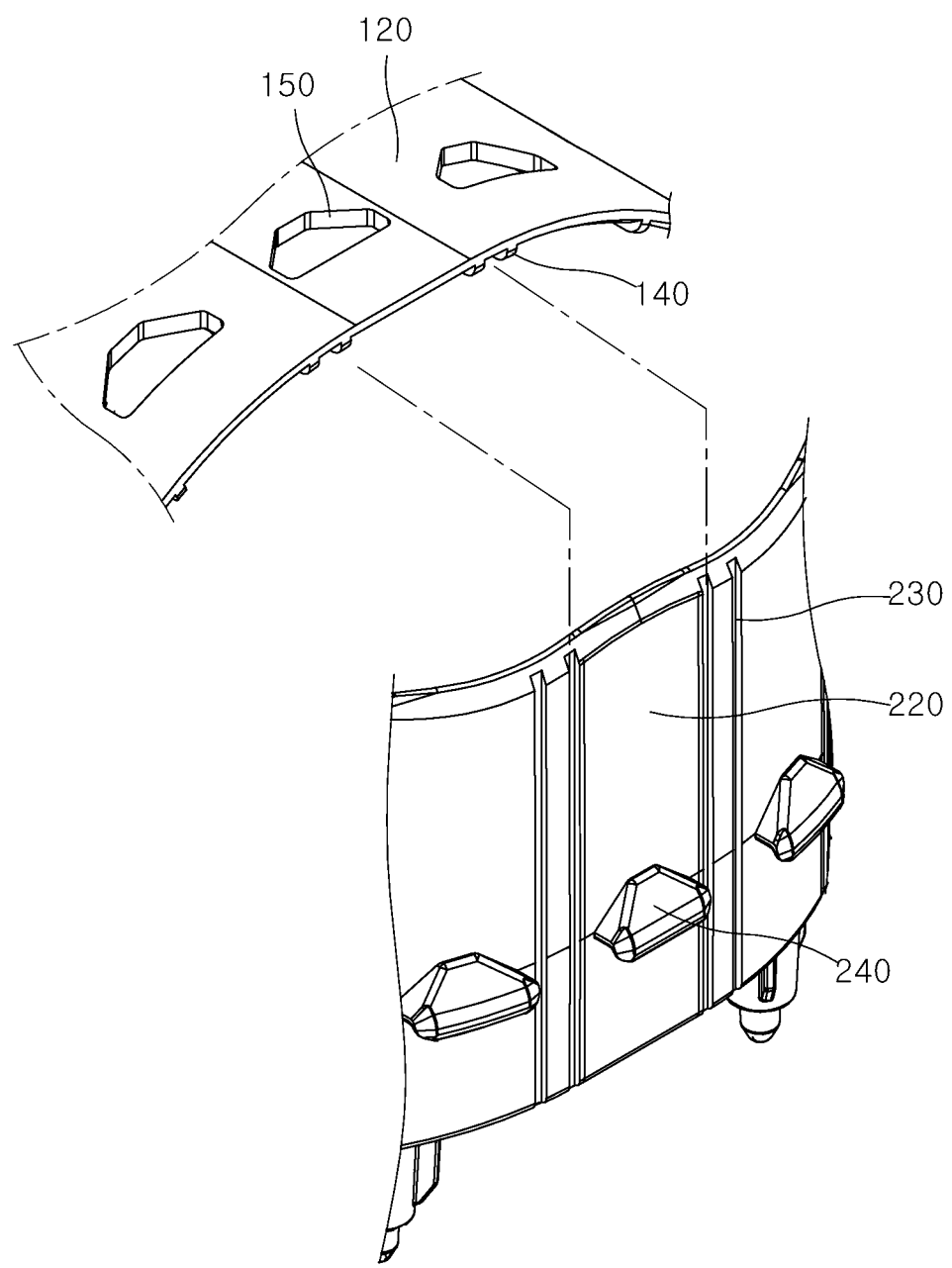
FIG. 7 is a diagram schematically illustrating that a stiffness rib of the cover device for an airbag according to an embodiment of the present disclosure is guided into a stiffness groove part.

FIG. 1 is a diagram schematically illustrating a cover device for an airbag according to an embodiment of the present disclosure. FIG. 2 is a perspective view of the cover device for an airbag according to an embodiment of the present disclosure. FIG. 3 is a perspective view of the cover device for an airbag according to an embodiment of the present disclosure, when viewed in another direction. FIG. 4 is a cross-sectional view taken along line A-A' in FIG. 3. FIG. 5 is an exploded perspective view of the cover device for an airbag according to an embodiment of the present disclosure. FIG. 6 is a perspective view of the cover device for an airbag according to an embodiment of the present disclosure, when viewed in another direction. FIG. 7 is a diagram schematically illustrating that a stiffness rib of the cover device for an airbag according to an embodiment of the present disclosure is guided into a stiffness groove part.

Referring to FIGS. 1, 2, 3, and 4, a cover device 1 for an airbag according to an embodiment of the present disclosure includes a cover unit 100, a mounting plate unit 200 and an emblem unit 300.

A stiffness rib 140 is provided on the inner surface of the cover unit 100. The cover unit 100 is positioned at the central part of a steering wheel 10 and forms a central appearance of the steering wheel 10.

Specifically, a space part (not illustrated) connected to an opening part 11 is formed at the center of the steering wheel 10. An airbag cushion (not illustrated) may be folded or packaged and received in the space part. The cover unit 100 is coupled to the mounting plate unit 200 to be described below and positioned in the space part, and covers the opening part 11 of the steering wheel 10. In this case, the stiffness rib 140 is not exposed to the outside and does not spoil the beauty compared to a conventional technology because the stiffness rib 140 is formed on the inner surface of the cover unit 100. A tear line 111 is formed in the cover unit 100. When the airbag cushion is deployed, the cover unit 100 is cut along the tear line 111 and divided in a plural number. Damage to the cover unit 100 can be reduced because the stiffness rib 140 is provided on the inner surface of the cover unit 100.

The mounting plate unit 200 is coupled to the cover unit 100. A stiffness groove part 230 that guides the stiffness rib 140 is formed in the outer surface of the mounting plate unit 200. The mounting plate unit 200 is positioned within the cover unit 100 and coupled to the cover unit 100. The mounting plate unit 200, coupled to the cover unit 100, is positioned in the space part of the steering wheel 10 and coupled to the steering wheel 10. In this case, the stiffness groove part 230 that guides the stiffness rib 140 is formed in a portion that belongs to the mounting plate unit 200 and that faces the cover unit 100. Accordingly, when the cover unit 100 and the mounting plate unit 200 are coupled, an assembly property can be improved because the cover unit 100 and the mounting plate unit 200 can be coupled at the home position.

The stiffness rib 140 may have the same width as the stiffness groove part 230. Accordingly, the stiffness rib 140 can be fitted into the stiffness groove part 230. That is, the stiffness rib 140 slides along and is coupled to the stiffness groove part 230 (refer to FIG. 7). Accordingly, the cover unit 100 and the mounting plate unit 200 can be firmly coupled, thereby preventing the cover unit 100 from being separated from the mounting plate unit 200, when the airbag cushion is deployed.

The cover unit 100 includes a cover body 110, a first cover plate 120, a second cover plate 130 and the stiffness rib 140. The tear line 111 is formed in the cover body 110. The plate-shaped cover body 110 covers the opening part 11 of the steering wheel 10. When the airbag cushion is deployed, the cover body 110 is cut along the tear line 111 and divided in a plural number.

The first cover plate 120 is extended from the edge of the cover body 110 toward the mounting plate unit 200, and surrounds the outside of the mounting plate unit 200. The first cover plate 120 is extended from the edge of the cover body 110 to the lower side (in the case of FIGS. 2 and 3) of the mounting plate unit, and forms a space capable of surrounding the airbag cushion along with the cover body 110.

The second cover plate 130 is extended from the edge of the cover body 110 toward the mounting plate unit 200. The second cover plate 130 is positioned on the outside of the first cover plate 120 so as to be spaced apart from the first cover plate 120.

The stiffness rib 140 protrudes from the inner surface of the first cover plate 120 toward the mounting plate unit 200. The stiffness rib 140 is positioned to face the stiffness groove part 230 (refer to FIG. 4).

The mounting plate unit 200 includes a mounting plate bottom unit 210 and a mounting plate body 220. An inflator (not illustrated) for introducing gas into the airbag cushion may be mounted on the mounting plate bottom unit 210.

The mounting plate body 220 is extended from the edge of the mounting plate bottom unit 210 toward the first cover plate 120. The stiffness groove part 230 is formed in the outer surface of the mounting plate body 220. The stiffness groove part 230 is positioned in the outer surface of the mounting plate body 220 so as to face the stiffness rib 140 (refer to FIG. 4).

As in FIG. 6, the stiffness rib 140 is elongated in a lengthwise direction $H_1$ of the first cover plate 120. The stiffness groove part 230 is elongated in the mounting plate body 220 in a lengthwise direction $H_2$ of the stiffness groove part 230. Accordingly, coupling power between the cover unit 100 and the mounting plate unit 200 can be increased.

The stiffness rib 140 and the stiffness groove part 230 may have the same length, but the present disclosure is not limited thereto. In some embodiments, the stiffness groove part 230 may be longer than the stiffness rib 140. The lengths of the stiffness rib 140 and the stiffness groove part 230 may be changed within a range in which the stiffness rib 140 and the stiffness groove part 230 are coupled.

The stiffness ribs 140 are formed in a plural number along the inner circumference of the first cover plate 120 so as to be spaced apart from each other. The stiffness groove parts 230 are formed in a plural number along the inner circumference of the mounting plate body 220 so as to be spaced apart from each other at the same intervals as the stiffness ribs 140 (refer to FIGS. 4 and 5).

A plurality of coupling hole parts 150 are formed along the circumference of the first cover plate 120 so as to be spaced apart from each other. The stiffness ribs 140 are positioned between the coupling hole parts 150. Coupling protrusions 240 coupled to the coupling hole parts 150 are formed along the circumference of the mounting plate body 220 so as to be spaced apart from each other. The stiffness groove parts 230 are positioned between the coupling protrusions 240.

If only the coupling hole parts 150 formed in the first cover plate 120 and the coupling protrusions 240 formed on the mounting plate body 220 are coupled when the cover unit 100 and the mounting plate unit 200 are coupled, the cover unit 100 may move on the mounting plate unit 200 due to a fabrication tolerance between the coupling hole parts 150 and the coupling protrusions 240.

As in FIGS. 3, 4, and 5, in the cover device 1 for an airbag according to the present disclosure, the stiffness ribs 140 are positioned between the coupling hole parts 150, and the stiffness groove parts 230 are positioned between the coupling protrusions 240. Accordingly, when the cover unit 100 and the mounting plate unit 200 are coupled, the coupling hole parts 150 and the coupling protrusions 240 can be coupled and the stiffness ribs 140 and the stiffness groove parts 230 can also be coupled.

That is, when the cover unit 100 and the mounting plate unit 200 are coupled, the coupling hole parts 150 formed in the first cover plate 120 and the coupling protrusions 240 formed on the mounting plate body 220 are primarily coupled. At the same time, the stiffness ribs 140 formed in the first cover plate 120 and the stiffness groove parts 230 formed in the mounting plate body 220 are secondarily coupled.

Accordingly, the cover unit 100 and the mounting plate unit 200 can be coupled more firmly, thereby preventing the cover unit 100 from moving on the mounting plate unit 200. That is, when the airbag cushion is deployed, the cover unit 100 can be further prevented from being separated from the mounting plate unit 200.

As described above, in the cover device 1 for an airbag according to the present disclosure, the stiffness of the cover unit 100 can be secured without degrading the beauty compared to a conventional technology, because the stiffness ribs 140 are not exposed to the outside since the stiffness ribs 140 formed on the inner surface of the cover unit 100 and the stiffness groove parts 230 formed in the outer surface of the mounting plate unit 200 and configured to guide the stiffness ribs 140.

Furthermore, when being coupled, the cover unit 100 and the mounting plate unit 200 can be coupled at the home position. Accordingly, an assembly property can be improved, and the cover unit 100 and the mounting plate unit 200 can be coupled more firmly, thereby preventing the cover unit 100 from moving on the mounting plate unit 200.

The cover device for an airbag according to the present disclosure has the stiffness ribs formed on the inner surface of the cover unit and the stiffness groove parts formed in the outer surface of the mounting plate unit and configured to guide the stiffness ribs. Accordingly, the stiffness ribs are not exposed to the outside such that the cover unit can secure stiffness without degrading the beauty compared to a conventional technology.

Furthermore, according to the present disclosure, since the stiffness groove parts guide the stiffness ribs, the cover unit and the mounting plate unit can be coupled at the home position when the cover unit and the mounting plate unit are coupled.

Furthermore, according to the present disclosure, the stiffness ribs can be fitted into the stiffness groove parts such that the cover unit and the mounting plate unit can be firmly coupled because the stiffness rib has the same width as the stiffness groove part. Accordingly, when the airbag cushion is deployed, the cover unit can be prevented from being separated from the mounting plate unit.

Furthermore, according to the present disclosure, the stiffness ribs are elongated in the lengthwise direction of the first cover plate of the cover unit and the stiffness groove parts are elongated in the mounting plate body of the mounting plate unit in the lengthwise direction of the stiffness groove parts. Accordingly, coupling power between the cover unit and the mounting plate unit can be enhanced.

Furthermore, according to the present disclosure, when the cover unit and the mounting plate unit are coupled, the coupling hole parts formed in the first cover plate and the coupling protrusions formed in the mounting plate body are primarily coupled. At the same time, the stiffness ribs formed in the first cover plate and the stiffness groove parts formed in the mounting plate body are secondarily coupled. Accordingly, the cover unit and the mounting plate unit can be coupled more firmly, thereby preventing the cover unit from moving on the mounting plate unit.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:
1. A cover device for an airbag, comprising:
  a cover unit having a stiffness rib formed on an inner surface of the cover unit; and
  a mounting plate unit positioned within the cover unit and having a stiffness groove part formed in an outer surface of the mounting plate unit and configured to guide the stiffness rib.
2. The cover device of claim 1, wherein the stiffness rib has a width identical to a width of the stiffness groove part.
3. The cover device of claim 1, wherein the cover unit comprises:
  a cover body having a tear line formed in the cover body;
  a first cover plate extended from an edge of the cover body toward the mounting plate unit and configured to surround an outside of the mounting plate unit;
  a second cover plate extended from the edge of the cover body toward the mounting plate unit and positioned on an outside of the first cover plate so as to be spaced apart from the first cover plate; and
  the stiffness rib protruding from an inner surface of the first cover plate toward the mounting plate unit.

4. The cover device of claim 3, wherein the mounting plate unit comprises:
   a mounting plate bottom unit; and
   a mounting plate body extended from an edge of the mounting plate bottom unit toward the first cover plate and having the stiffness groove part formed in an outer surface of the mounting plate body.

5. The cover device of claim 4, wherein:
   the stiffness rib is elongated in a lengthwise direction of the first cover plate, and
   the stiffness groove part is elongated in the mounting plate body in a lengthwise direction of the stiffness groove part.

6. The cover device of claim 4, wherein:
   the stiffness ribs are formed in a plural number along an inner circumference of the first cover plate to be spaced apart from each other, and
   the stiffness groove parts are formed in a plural number along an inner circumference of the mounting plate body to be spaced apart from each other at the same intervals as the stiffness ribs.

7. The cover device of claim 6, wherein:
   a plurality of coupling hole parts are formed along the circumference of the first cover plate so as to be spaced apart from each other,
   the stiffness ribs are disposed between the coupling hole parts,
   coupling protrusions coupled to the coupling hole parts are formed along the circumference of the mounting plate body to be spaced apart from each other, and
   the stiffness groove parts are disposed between the coupling protrusions.

* * * * *